(12) United States Patent
Zhu et al.

(10) Patent No.: US 12,550,159 B2
(45) Date of Patent: Feb. 10, 2026

(54) MULTIPLE DOWNLINK CONTROL INFORMATION TRANSMISSIONS

(71) Applicant: LENOVO (BEIJING) LIMITED, Beijing (CN)

(72) Inventors: Chenxi Zhu, Fairfax, VA (US); Bingchao Liu, Beijing (CN); Yi Zhang, Beijing (CN); Wei Ling, Beijing (CN); Lingling Xiao, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 355 days.

(21) Appl. No.: 18/028,468

(22) PCT Filed: Sep. 25, 2020

(86) PCT No.: PCT/CN2020/117648
§ 371 (c)(1),
(2) Date: Mar. 24, 2023

(87) PCT Pub. No.: WO2022/061692
PCT Pub. Date: Mar. 31, 2022

(65) Prior Publication Data
US 2023/0371038 A1 Nov. 16, 2023

(51) Int. Cl.
*H04W 4/00* (2018.01)
*H04L 5/00* (2006.01)
*H04W 72/232* (2023.01)

(52) U.S. Cl.
CPC ......... *H04W 72/232* (2023.01); *H04L 5/0053* (2013.01); *H04L 5/0094* (2013.01)

(58) Field of Classification Search
CPC H04W 72/232; H04W 5/0053; H04W 5/0094
See application file for complete search history.

(56) References Cited

U.S. PATENT DOCUMENTS

| | | |
|---|---|---|
| 2016/0073385 A1 | 3/2016 | Park et al. |
| 2020/0007296 A1* | 1/2020 | Papasakellariou .... H04L 1/1861 |
| 2020/0196346 A1* | 6/2020 | Khoshnevisan .... H04W 72/044 |
| 2021/0360667 A1* | 11/2021 | Moon ................... H04L 5/0035 |
| 2022/0007371 A1* | 1/2022 | Kyung ............. H04W 72/0446 |

(Continued)

FOREIGN PATENT DOCUMENTS

| | | |
|---|---|---|
| CN | 109309547 A | 2/2019 |
| WO | 2019142051 A1 | 7/2019 |

OTHER PUBLICATIONS

International Searching Authority, "Written Opinion of the International Searching Authority," PCT/CN2020/117648, May 31, 2021, pp. 1-4.

*Primary Examiner* — Abdelnabi O Musa
(74) *Attorney, Agent, or Firm* — Kunzler Needham & Hilton

(57) ABSTRACT

Apparatuses, methods, and systems are disclosed for multiple downlink control information transmissions. One method (700) includes transmitting (702), to a user equipment, downlink control information a plurality of times, wherein: each transmission of the downlink control information comprises the same downlink control information; and each transmission of the downlink control information is in a physical downlink control channel candidate in a configured control resources set.

20 Claims, 8 Drawing Sheets

(56) References Cited

U.S. PATENT DOCUMENTS

| | | | |
|---|---|---|---|
| 2023/0076897 A1* | 3/2023 | Svedman | H04L 5/0053 |
| 2023/0128932 A1* | 4/2023 | Kim | H04W 72/23 |
| | | | 370/336 |
| 2023/0132040 A1* | 4/2023 | Gao | H04W 72/23 |
| | | | 370/329 |
| 2023/0132212 A1* | 4/2023 | Gao | H04L 1/1812 |
| | | | 370/329 |
| 2024/0032025 A1* | 1/2024 | Gao | H04W 72/232 |

* cited by examiner

MULTIPLE DOWNLINK CONTROL INFORMATION TRANSMISSIONS

FIELD

The subject matter disclosed herein relates generally to wireless communications and more particularly relates to multiple downlink control information transmissions.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Aperiodic ("AP"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Carrier Aggregation ("CA"), Code Block Group ("CBG"), CBG Flushing Out Information ("CBGFI"), CBG Transmission Information ("CBGTI"), Component Carrier ("CC"), Control Channel Element ("CCE"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), Cyclic Redundancy Check ("CRC"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink Feedback Information ("DFI"), Downlink ("DL"), Discrete Fourier Transform Spread OFDM ("DFT-s-fOFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiplexing ("FDM"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), High-Speed Train ("HST"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Least-Significant Bit ("LSB"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Maximum Permissible Exposure ("MPE"), Most-Significant Bit ("MSB"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Non-Coherent Joint Transmission ("NCJT"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Remote Radio Head ("RRH"), Reference Signal ("RS"), Reference Signal Received Power ("RSRP"), Reference Signal Received Quality ("RSRQ"), Redundancy Version ("RV"), Receive ("RX"), Single Carrier Frequency Domain Spread Spectrum ("SC-FDSS"), Secondary Cell ("SCell"), Spatial Channel Model ("SCM"), Sub Carrier Spacing ("SCS"), Single DCI ("S-DCI"), Spatial Division Multiplexing ("SDM"), Service Data Unit ("SDU"), Single Frequency Network ("SFN"), Subscriber Identity Module ("SIM"), Signal-to-Interference Ratio ("SINR"), Sidelink ("SL"), Sequence Number ("SN"), Semi Persistent ("SP"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indication ("TCI"), Time Division Duplex ("TDD"), Time Division Multiplexing ("TDM"), Temporary Mobile Subscriber Identity ("TMSI"), Transmit Power Control ("TPC"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Ultra Reliable Low Latency Communication ("URLLC"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Virtual Resource Block ("VRB"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, downlink control information may be transmitted.

BRIEF SUMMARY

Methods for multiple downlink control information transmissions are disclosed. Apparatuses and systems also perform the functions of the methods. In one embodiment, the method includes transmitting, to a user equipment, downlink control information a plurality of times, wherein: each transmission of the downlink control information comprises the same downlink control information; and each transmission of the downlink control information is in a physical downlink control channel candidate in a configured control resources set.

An apparatus for multiple downlink control information transmissions, in one embodiment, includes a transmitter that transmits, to a user equipment, downlink control information a plurality of times, wherein: each transmission of the downlink control information comprises the same downlink control information; and each transmission of the downlink control information is in a physical downlink control channel candidate in a configured control resources set.

A method for multiple downlink control information transmissions includes receiving, at a user equipment, downlink control information a plurality of times, wherein: each reception of the downlink control information comprises the same downlink control information; and each reception of the downlink control information is in a physical downlink control channel candidate in a configured control resources set.

An apparatus for multiple downlink control information transmissions, in one embodiment, includes a receiver that receives downlink control information a plurality of times, wherein: each reception of the downlink control information comprises the same downlink control information; and each reception of the downlink control information is in a physical downlink control channel candidate in a configured control resources set.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
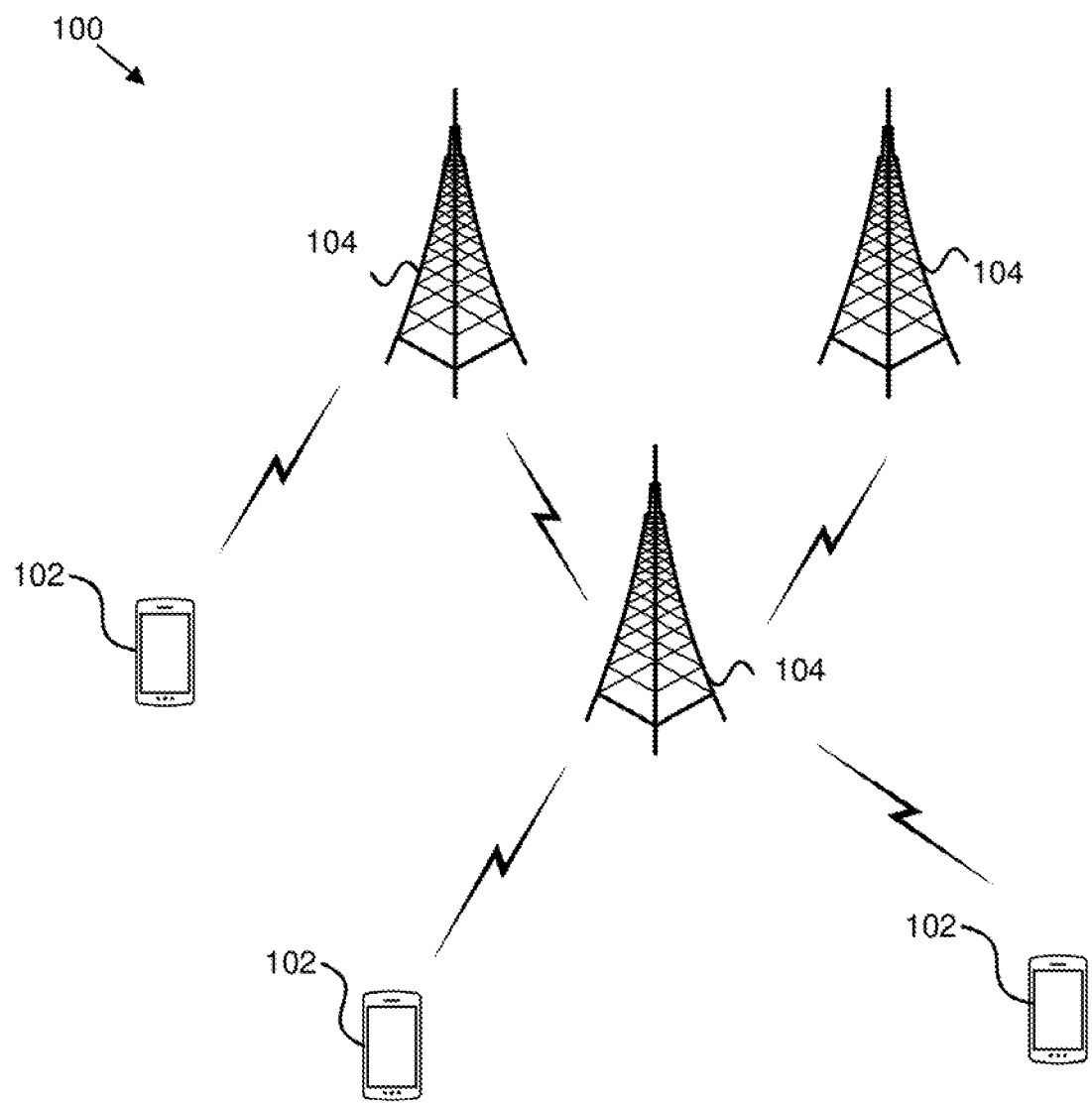
FIG. 1 is a schematic block diagram illustrating one embodiment of a wireless communication system for multiple downlink control information transmissions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for multiple downlink control information transmissions. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may transmit, to a user equipment (e.g., remote unit 102), downlink control information a plurality of times, wherein: each transmission of the downlink control information comprises the same downlink control information; and each transmission of the downlink control information is in a physical downlink control channel candidate in a configured control resources set. Accordingly, a network unit 104 may be used for multiple downlink control information transmissions.

In some embodiments, a remote unit 102 (e.g., user equipment) may receive downlink control information a plurality of times, wherein: each reception of the downlink control information comprises the same downlink control information; and each reception of the downlink control information is in a physical downlink control channel candidate in a configured control resources set. Accordingly, a remote unit 102 may be used for multiple downlink control information transmissions.

Figure 2:
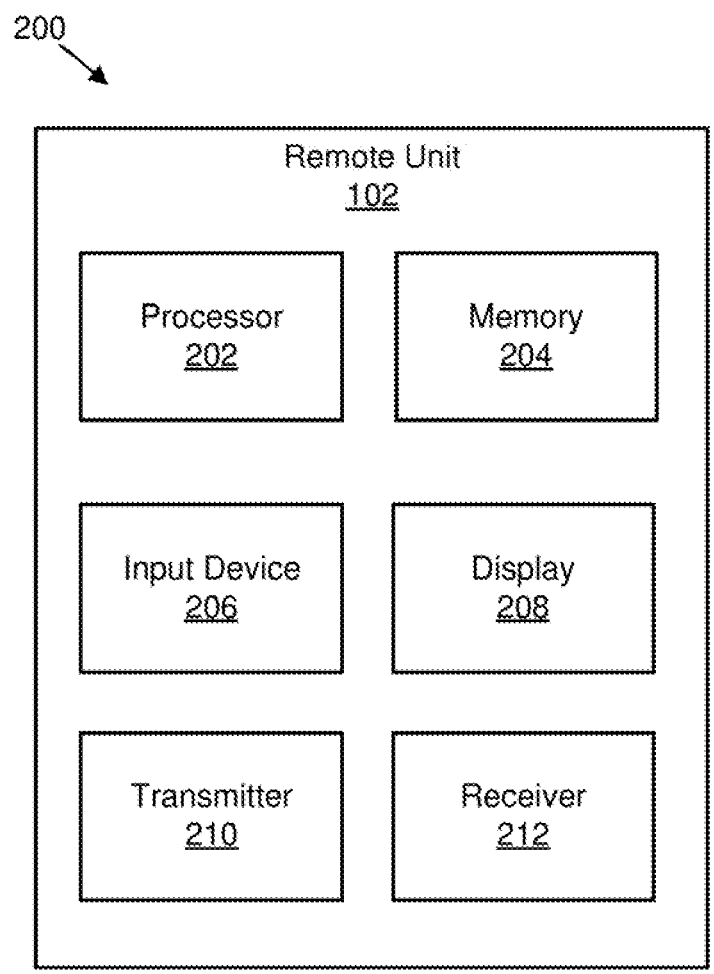
FIG. 2 is a schematic block diagram illustrating one embodiment of an apparatus that may be used for multiple downlink control information transmissions.

FIG. 2 depicts one embodiment of an apparatus 200 that may be used for multiple downlink control information transmissions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 may be used for transmitting information described herein and/or the receiver 212 may be used for receiving information described herein and/or the processor 202 may be used for processing information described herein.

In some embodiments, the receiver 212 may receive downlink control information a plurality of times, wherein: each reception of the downlink control information comprises the same downlink control information; and each reception of the downlink control information is in a physical downlink control channel candidate in a configured control resources set.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
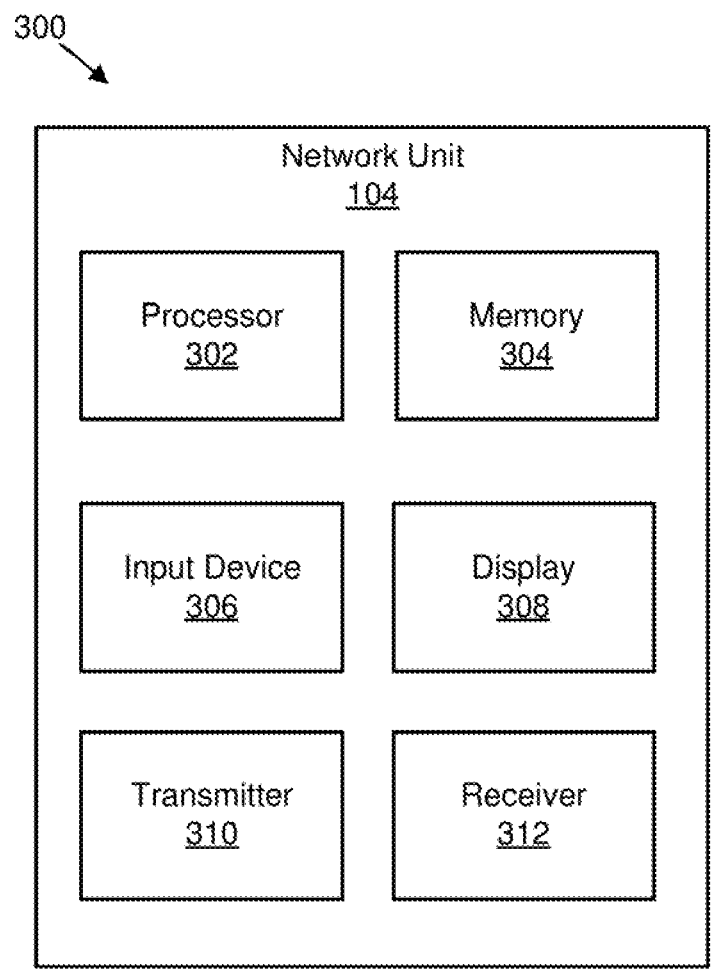
FIG. 3 is a schematic block diagram illustrating one embodiment of an apparatus that may be used for multiple downlink control information transmissions.

FIG. 3 depicts one embodiment of an apparatus 300 that may be used for multiple downlink control information transmissions. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit, to a user equipment (e.g., remote unit 102), downlink control information a plurality of times, wherein: each transmission of the downlink control information comprises the same downlink control information; and each transmission of the downlink control information is in a physical downlink control channel candidate in a configured control resources set.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various embodiments, PDCCH using multiple TRPs may be enhanced. In such embodiments, to enhance the reliability and robustness of PDCCH, DCI may be transmitted from multiple TRPs to use spatial diversity, time diversity, and/or frequency diversity with multiple transmissions.

In some embodiments, DCI may be transmitted one or more times without prior configuration. In certain embodiments, if DCI is transmitted once, DCI may be transmitted in a PDCCH candidate in a search space of a configured CORESET. In various embodiments, if DCI is transmitted N times (e.g., N>1), each time DCI is transmitted in a PDCCH candidate in a search space of a configured CORESET, the DCI transmission may follow a time and/or frequency resource configuration and a TCI of the CORESET. In such embodiments, N PDCCH candidates may not be associated with each other either by specification or by configuration. Moreover, the parameter N may not be configured or signaled to a UE in advance. Furthermore, each transmission may be independent of the others. In contrast to embodiments in which a UE is configured in advance with a repetition number N and a gNB always transmitting the same DCI in N associated PDCCH candidates in different CORESETs, in embodiments described herein, a gNB has the ability to determine how many times (e.g., N) the gNB transmits DCI to a UE and which PDCCH candidates to use.

Figure 4:
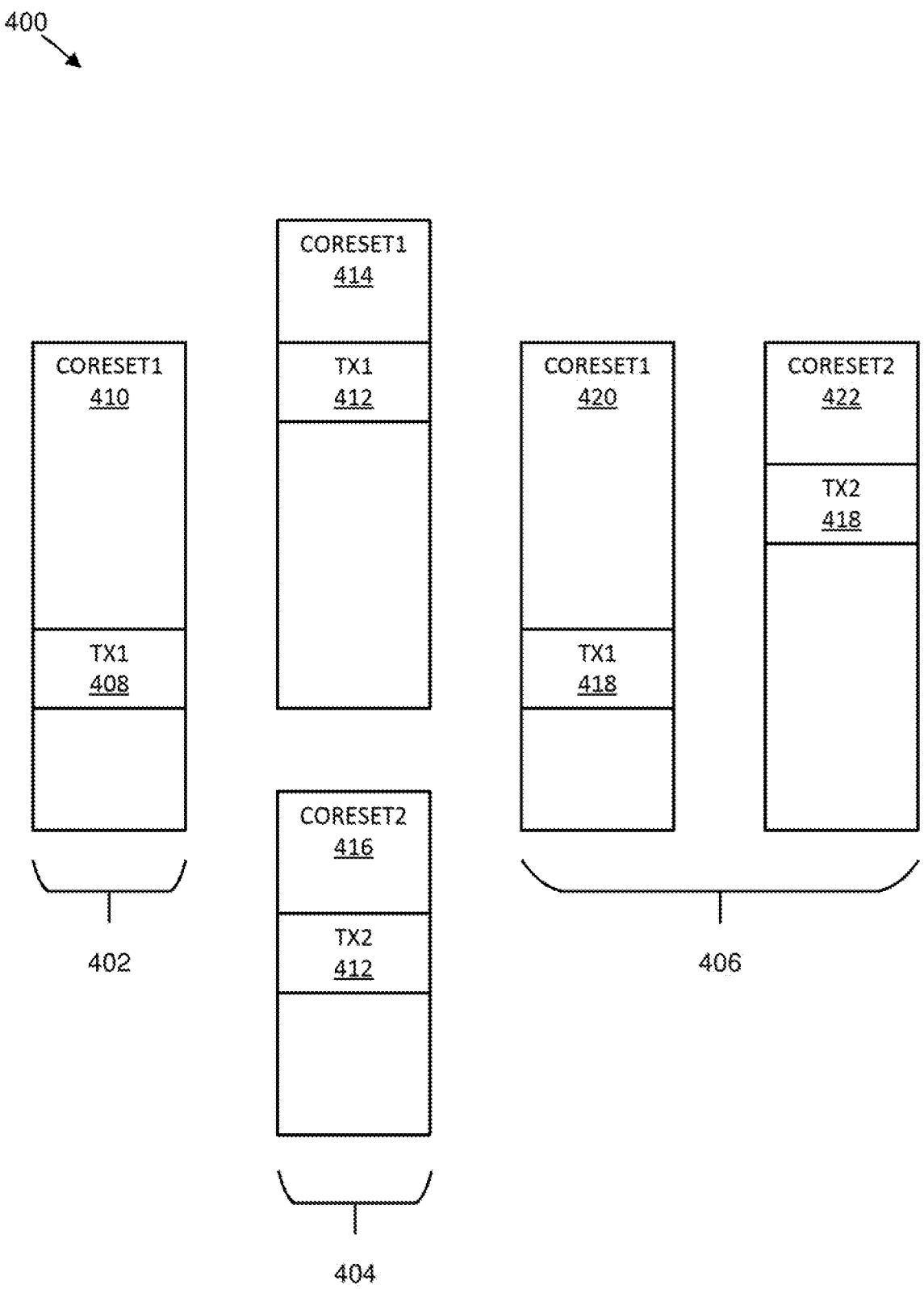
FIG. 4 is a schematic block diagram illustrating one embodiment of flexible repeated transmission of DCI including: a single transmission; two transmissions as FDM; and two transmissions as TDM.

FIG. 4 is a schematic block diagram illustrating one embodiment of flexible repeated transmission 400 of DCI including: single transmission 402; two transmissions as FDM 404; and two transmissions as TDM 406.

In the single transmission 402, a DCI 408 (TX1) is transmitted once in a CORESET1 410 configured for a UE. In the two transmissions as FDM 404, a DCI 412 is transmitted twice (TX1 and TX2) in CORESET1 414 and CORESET2 416 as FDM. In the two transmissions as TDM 406, a DCI 418 is transmitted twice (TX1 and Tx2) in CORESET1 420 and CORESET2 422 as TDM. The frequency position (e.g., occupied CCEs) in CORESET1 420 and CORESET2 422 are not necessarily the same, as long as each of them is a valid PDCCH candidate in its CORESET. Moreover, aggregation levels of multiple transmissions of a same DCI are not necessarily the same. For example, an aggregation level of one of 1-16 may apply to transmissions individually. Accordingly, a gNB may have the freedom to transmit individual copies of the same DCI. Further, a UE decodes the DCI independently in each transmission in a configured search space just like a single DCI transmission. As may be appreciated, until a UE decodes multiple copies of the same DCI successfully and examines a payload, the UE is not aware that a same DCI is transmitted multiple times.

In some embodiments, with an absence of an association between resources of multiple transmissions of the same DCI (e.g., PDCCH candidates in a time and/or frequency domain) and individual decoding of each transmitted copy of the same DCI, a UE may still be configured to tell if it has received multiple copies of the same DCI.

In various embodiments, a UE may be configured to identify multiple transmission of the same DCI. In such embodiments, DCI payloads may be the same except for one or more fields added to and/or transmitted with the DCI payloads. In certain embodiments, one or two new fields may be added to a DCI format for DCI identification and completion time indication with the rest of the DCI payload remains remaining same. As may be appreciated, certain references herein to the "same DCI" may mean that newly added fields may be different while the other DCI fields remain the same.

Figure 5:
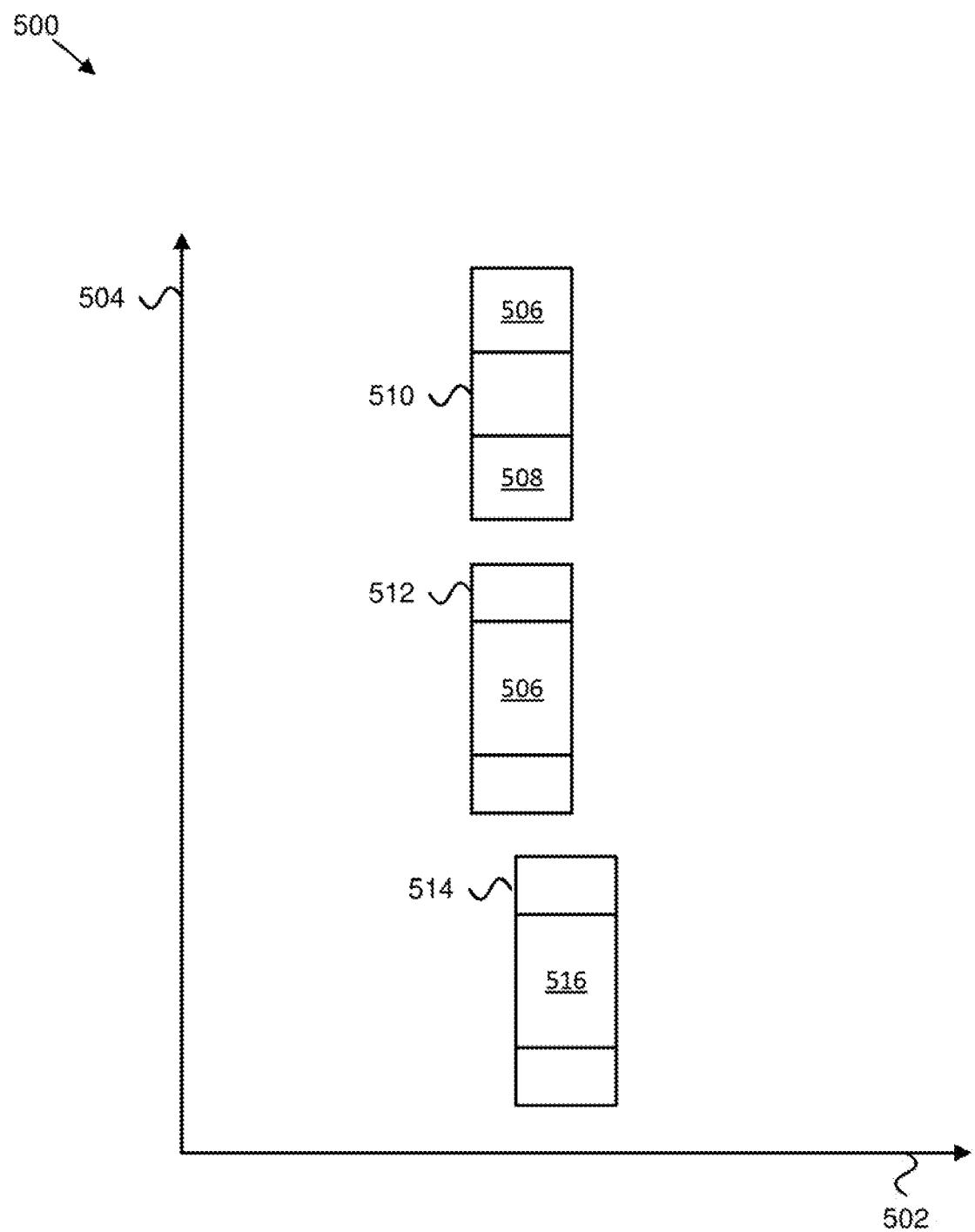
FIG. 5 is a schematic block diagram illustrating one embodiment of DCI repetition with the same completion time.

In a first embodiment, a DCI may be transmitted multiple times in different CORESETs as FDM (e.g., two transmissions as FDM 404). In such an embodiment, PDCCH candidates (e.g., resources) used for transmissions overlap in a frequency domain and all end in the same OFDM symbol. Moreover, in such an embodiment, a receiving time of a DCI is the last OFDM symbol of a transmission. Further, each DCI contains a sequence number. In such an embodiment, if a UE can receive up to K (e.g., K>1) different DCIs at the same time, $N_K$ (e.g., $N_K = \lceil \log_2(K) \rceil$) bits are used for the sequence number. Different transmissions of the same DCI are given the same sequence number, while different DCIs have different sequence numbers. The sequence number is only significant at each reception time (e.g., two DCIs at different reception times with the same DCI sequence number represent different DCIs that need to be processed separately). Among the DCIs received at the same time, if a UE finds that two DCIs have the same sequence number, the UE may keep only one copy of the DCI and discard the rest since these DCIs with the same sequence number that have the same reception time are duplicates of the same DCI. After removing all the duplicates, the UE acts on the remaining DCIs. FIG. 5 provides an example of this embodiment.

FIG. 5 is a schematic block diagram 500 illustrating one embodiment of DCI repetition with the same completion time. The diagram 500 is illustrated over a time 502 (e.g., OFDM symbol) and frequency 504 (e.g., CCE).

In FIG. 5, DCI1 506 and DCI2 508 are transmitted simultaneously as FDM. DCI1 506 (having sequence number=1) is transmitted twice in CORESET1 510 and CORESET2 512. DCI2 508 (having sequence number=2) is transmitted once in CORESET1 510. If a UE decodes all three PDCCH candidates (DCI1 506 and DCI2 508) successfully, the UE may check the sequence number to determine whether any of the DCI transmissions are the same. The UE knows DCI1 506 is transmitted twice because the two transmissions of DCI1 506 have the same sequence number (e.g., 1), and DCI2 508 is transmitted only once because it has a different sequence number (e.g., 2). The UE may process only one copy of DCI1 506 and DCI2 508. In CORESET3 514 DCI3 516 is transmitted with sequence number 1. Because the receiving time of DCI3 516 is later than DCI1 506, even with the same sequence number, the UE knows that DCI3 516 is not a repetition of DCI1 506 and processes it separately.

In certain embodiments, if a DCI may be transmitted multiple times with the same reception time (e.g., FDM), a DCI sequence number is added to a DCI format to identify each unique DCI at a reception time. Accordingly, multiple transmission of the same DCI have the same sequence number, and different DCIs have different sequence numbers.

In a second embodiment, a DCI may be transmitted multiple times with different completion times. The second embodiment may apply to configurations having TDM DCI repetition as well configurations with partially overlapping FDM transmission with different completion times. In the second embodiment, each DCI transmission is in a valid PDCCH candidate in a configured CORESET. In addition to a DCI sequence number, a time-to-complete ("TOC") is added to the DCI format. The time-to-complete is a number of OFDM symbols from the last symbol of the current transmission instance to the last symbol of the last transmission instance of the same DCI. As an example, the TOC field may have 4 bits thereby enabling a maximum of 15 symbols between the transmission of the first and the last DCI transmission. If a DCI is transmitted only once, the time-to-complete is 0.

Figure 6:
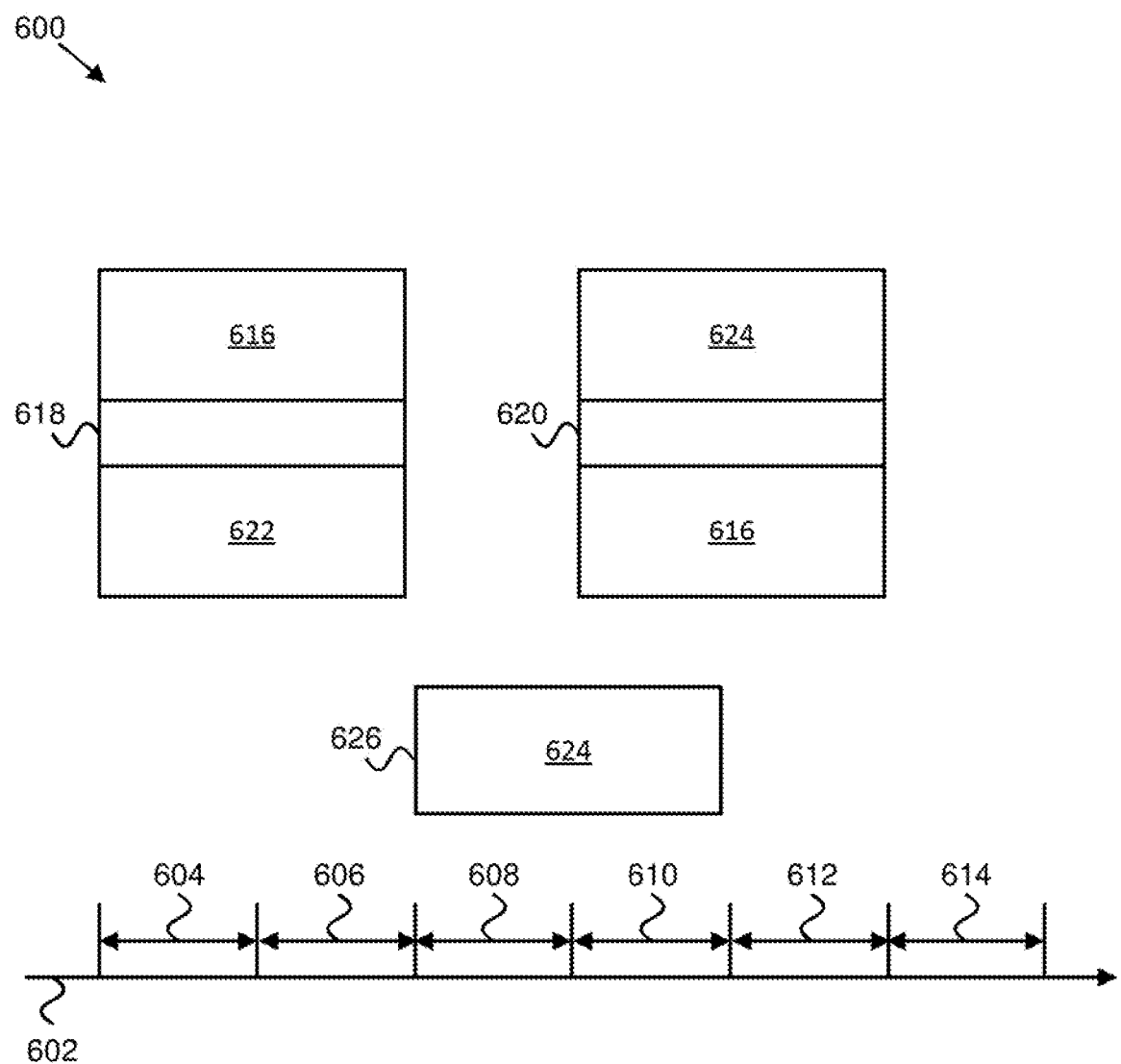
FIG. 6 is a schematic block diagram illustrating one embodiment of DCI repetition with potentially different completion time.

FIG. 6 is a schematic block diagram 600 illustrating one embodiment of DCI repetition with potentially different completion times. A time 602 (e.g., OFDM symbol) is illustrated with a first OFDM symbol 604 ("0"), a second OFDM symbol 606 ("1"), a third OFDM symbol 608 ("2"), a fourth OFDM symbol 610 ("3"), a fifth OFDM symbol 612 ("4"), and a sixth OFDM symbol 614 ("5").

In FIG. 6, DCI1 616 is transmitted twice in CORESET1 618 and CORESET3 620. The time-to-complete of the first transmission of DCI1 616 in CORESET1 618 is 3 (e.g., OFDM symbols), and the time-to-complete for the second (and last) transmission of DCI1 616 in CORESET3 620 is 0. The completion time of DCI1 616 is symbol 4. DCI2 622 is transmitted only once so its TOC is 0, and its completion time is symbol 1. The sequence number is significant for a given completion time. For DCI1 616 and DCI2 622, because they have different completion times (derived from the TOC field and the OFDM symbols used for each transmission), the UE can distinguish them even with both having the same DCI sequence number of 1. DCI3 624 is transmitted twice in CORESET2 626 and CORESET3 620 partially overlapping in time, but the first transmission of DCI3 624 in CORESET2 626 has TOC=1 and the second transmission of DCI3 624 in CORESET3 620 has TOC=0, making the completion time for DCI3 624 symbol 4. Among the DCIs with completion time of symbol 4, DCI1 616 has sequence number 1 and DCI3 624 has sequence number 2. If the UE receives both copies of DCI1 616 (or DCI3 624), the UE keeps and processes one copy and discard the others at the completion time. If the UE receives only one of the copies of a repeated DCI, it processes the DCI at the completion time. For example, if a UE receives DCI1 616 only from CORESET1 618 and not from CORESET3 620, the UE still acts on the DCI as if it is received at its completion time (e.g., symbol 4). Some DCIs require the UE to act at a certain time after receiving the DCI. To derive the same completion time from potentially multiple copies of the same DCI received at different times avoids ambiguity in the time the UE should act on the DCI.

In various embodiments, if a DCI can be transmitted multiple times with different completion times (e.g., TDM, or partially overlapping FDM), a time-to-complete (TOC) field may be added to and/or transmitted with a DCI format to indicate a time from the last symbol of the transmission with the TOC field to the last symbol of the last transmission of the same DCI. The TOC may be given in terms of OFDM symbols. From TOC in received DCI, a UE may derive a completion time of a DCI with potentially multiple repeated transmissions. A DCI sequence number field may also be added to and/or transmitted with the DCI for each completion time. Different DCIs with the same completion time may be given different sequence number for identification. Repeated transmission of the same DCI may have the same sequence number for duplication detection. From the combination of the completion time and sequence number information, a UE is able to identify each unique DCI. The UE retains a copy of the same DCI and discards the rest, and acts on the DCI as if it is received at the completion time.

In various embodiments, there may be no special requirement in CORESET configurations or PDCCH decoding to perform the embodiments described herein, but the embodiments described herein may use a new UE capability to detect duplicated DCIs. In some embodiments, a UE may signal its capability to perform the embodiments described herein through RRC signals. In certain embodiments, a gNB may configure a DCI format to include the new fields (e.g., for sequence number information and/or completion time) only if the UE has the corresponding capability, and the gNB may configure the UE to receive repeated DCI transmissions based on the embodiments described herein. In various embodiments, after a UE reports to a gNB that it has the capability to perform the embodiments described herein and has received a corresponding configuration from the gNB of the repeated transmission mode, the UE starts receiving DCIs and processing the DCIs according to the new fields.

In certain embodiments, a UE reports its capability to receive DCI transmitted multiple times. In some embodiments, a gNB configures a UE to receive DCI transmitted potentially multiple times including new DCI fields (e.g., sequence number, time-to-completion) before sending repeated DCIs to the UE.

Figure 7:
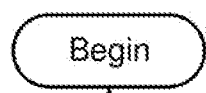
FIG. 7 is a schematic flow chart diagram illustrating one embodiment of a method for multiple downlink control information transmissions.
Figure 7:
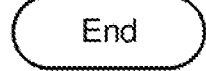

FIG. 7 is a schematic flow chart diagram illustrating one embodiment of a method 700 for multiple downlink control information transmissions. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

The method 700 may include transmitting 702, to a user equipment (e.g., remote unit 102), downlink control information a plurality of times, wherein: each transmission of the downlink control information comprises the same downlink control information; and each transmission of the downlink control information is in a physical downlink control channel candidate in a configured control resources set.

In certain embodiments, each transmission of the downlink control information is transmitted with a transmission control indicator state. In some embodiments, each transmission of the downlink control information is independently decodable. In various embodiments, the method 700 further comprises transmitting a downlink control information sequence number with each transmission of the downlink control information.

In one embodiment, the downlink control information sequence number is the same for each transmission of the same downlink control information. In certain embodiments, at least two transmissions of the downlink control information occur at the same time. In some embodiments, at least two transmissions of the downlink control information occur at different times.

In various embodiments, the method 700 further comprises transmitting time-to-complete information with each transmission of the downlink control information, wherein the time-to-complete information indicates a number of orthogonal frequency domain multiplexing symbols from an end of a first downlink control information transmission carrying the time-to-complete information to an end of a second downlink control information transmission, the first downlink control information transmission and the second first downlink control information transmission carry the same downlink control information, and the second downlink control information transmission is the last transmission of the same downlink control information. In one embodiment, the transmission control indicator comprises a quasi-co-location Type A for a first non-zero power channel state information reference signal resource, and for frequency range 2 a quasi-co-location Type D for a second non-zero power channel state information reference signal resource. In certain embodiments, the method 700 further comprises transmitting configuration information to the user equipment that configures the user equipment to receive multiple transmissions having the same downlink control information.

In some embodiments, the method 700 further comprises transmitting configuration information to the user equipment that configures the user equipment to receive a downlink control information sequence number with the downlink control information. In various embodiments, the method 700 further comprises transmitting configuration information to the user equipment that configures the user equipment to receive time-to-complete information with the downlink control information.

Figure 8:
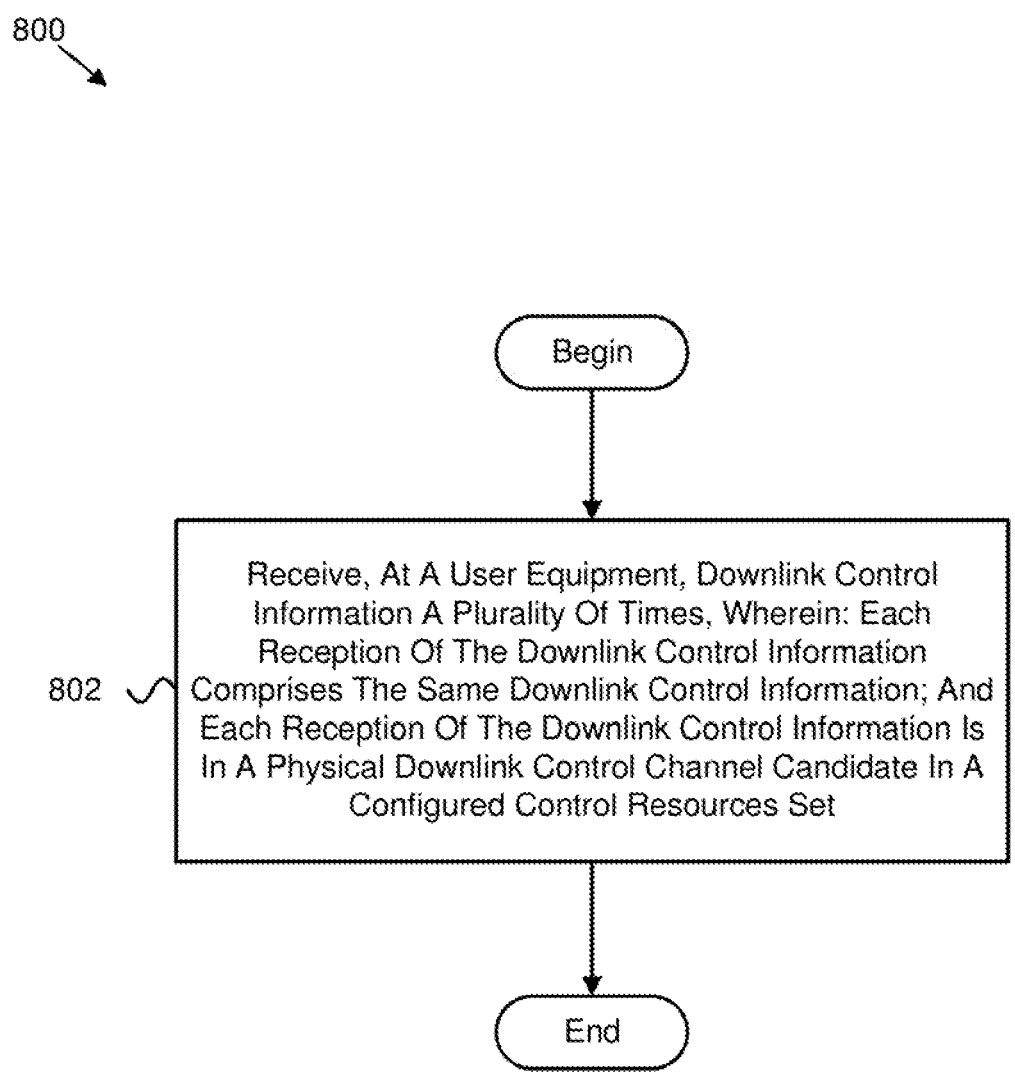
FIG. 8 is a schematic flow chart diagram illustrating another embodiment of a method for multiple downlink control information transmissions.

FIG. 8 is a schematic flow chart diagram illustrating another embodiment of a method 800 for multiple downlink control information transmissions. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802, at a user equipment (e.g., remote unit 102), downlink control information a plurality of times, wherein: each reception of the downlink control information comprises the same downlink control information; and each reception of the downlink control information is in a physical downlink control channel candidate in a configured control resources set.

In certain embodiments, each transmission of the downlink control information is transmitted with a transmission control indicator state. In some embodiments, each reception of the downlink control information is independently decodable. In various embodiments, the method 800 further comprises receiving a downlink control information sequence number with each reception of the downlink control information.

In one embodiment, the downlink control information sequence number is the same for each reception of the same downlink control information. In certain embodiments, the user equipment acts on only one reception of the same downlink control information. In some embodiments, at least two receptions of the downlink control information occur at the same time.

In various embodiments, at least two receptions of the downlink control information occur at different times. In one embodiment, the method 800 further comprises receiving time-to-complete information with each transmission of the downlink control information, wherein the time-to-complete information indicates a number of orthogonal frequency domain multiplexing symbols from an end of a first downlink control information reception carrying the time-to-complete information to an end of a second downlink control information reception, the first downlink control information reception and the second first downlink control information reception carry the same downlink control information, and the second downlink control information reception is the last reception of the same downlink control information. In certain embodiments, the user equipment acts on only one reception of the downlink control information.

In some embodiments, the transmission control indicator comprises a quasi-co-location Type A for a first non-zero power channel state information reference signal resource and for frequency range 2 a quasi-co-location Type D for a second non-zero power channel state information reference signal resource. In various embodiments, the method 800 further comprises reporting a user equipment capability report that indicates whether the user equipment is capable of receiving multiple transmissions having the same downlink control information.

In one embodiment, a method comprises: transmitting, to a user equipment, downlink control information a plurality of times, wherein: each transmission of the downlink control information comprises the same downlink control information; and each transmission of the downlink control information is in a physical downlink control channel candidate in a configured control resources set.

In certain embodiments, each transmission of the downlink control information is transmitted with a transmission control indicator state.

In some embodiments, each transmission of the downlink control information is independently decodable.

In various embodiments, the method further comprises transmitting a downlink control information sequence number with each transmission of the downlink control information.

In one embodiment, the downlink control information sequence number is the same for each transmission of the same downlink control information.

In certain embodiments, at least two transmissions of the downlink control information occur at the same time.

In some embodiments, at least two transmissions of the downlink control information occur at different times.

In various embodiments, the method further comprises transmitting time-to-complete information with each transmission of the downlink control information, wherein the time-to-complete information indicates a number of orthogonal frequency domain multiplexing symbols from an end of a first downlink control information transmission carrying the time-to-complete information to an end of a second downlink control information transmission, the first downlink control information transmission and the second first downlink control information transmission carry the same downlink control information, and the second downlink control information transmission is the last transmission of the same downlink control information.

In one embodiment, the transmission control indicator comprises a quasi-co-location Type A for a first non-zero power channel state information reference signal resource, and for frequency range 2 a quasi-co-location Type D for a second non-zero power channel state information reference signal resource.

In certain embodiments, the method further comprises transmitting configuration information to the user equipment that configures the user equipment to receive multiple transmissions having the same downlink control information.

In some embodiments, the method further comprises transmitting configuration information to the user equipment that configures the user equipment to receive a downlink control information sequence number with the downlink control information.

In various embodiments, the method further comprises transmitting configuration information to the user equipment that configures the user equipment to receive time-to-complete information with the downlink control information.

In one embodiment, an apparatus comprises: a transmitter that transmits, to a user equipment, downlink control information a plurality of times, wherein: each transmission of the downlink control information comprises the same downlink control information; and each transmission of the downlink control information is in a physical downlink control channel candidate in a configured control resources set.

In certain embodiments, each transmission of the downlink control information is transmitted with a transmission control indicator state.

In some embodiments, each transmission of the downlink control information is independently decodable.

In various embodiments, the transmitter transmits a downlink control information sequence number with each transmission of the downlink control information.

In one embodiment, the downlink control information sequence number is the same for each transmission of the same downlink control information.

In certain embodiments, at least two transmissions of the downlink control information occur at the same time.

In some embodiments, at least two transmissions of the downlink control information occur at different times.

In various embodiments, the transmitter transmits time-to-complete information with each transmission of the downlink control information, the time-to-complete information indicates a number of orthogonal frequency domain multiplexing symbols from an end of a first downlink control information transmission carrying the time-to-complete information to an end of a second downlink control information transmission, the first downlink control information transmission and the second first downlink control information transmission carry the same downlink control information, and the second downlink control information transmission is the last transmission of the same downlink control information.

In one embodiment, the transmission control indicator comprises a quasi-co-location Type A for a first non-zero power channel state information reference signal resource, and for frequency range 2 a quasi-co-location Type D for a second non-zero power channel state information reference signal resource.

In certain embodiments, the transmitter transmits configuration information to the user equipment that configures the user equipment to receive multiple transmissions having the same downlink control information.

In some embodiments, the transmitter transmits configuration information to the user equipment that configures the user equipment to receive a downlink control information sequence number with the downlink control information.

In various embodiments, the transmitter transmits configuration information to the user equipment that configures the user equipment to receive time-to-complete information with the downlink control information.

In one embodiment, a method comprises: receiving, at a user equipment, downlink control information a plurality of times, wherein: each reception of the downlink control information comprises the same downlink control information; and each reception of the downlink control information is in a physical downlink control channel candidate in a configured control resources set.

In certain embodiments, each transmission of the downlink control information is transmitted with a transmission control indicator state.

In some embodiments, each reception of the downlink control information is independently decodable.

In various embodiments, the method further comprises receiving a downlink control information sequence number with each reception of the downlink control information.

In one embodiment, the downlink control information sequence number is the same for each reception of the same downlink control information.

In certain embodiments, the user equipment acts on only one reception of the same downlink control information.

In some embodiments, at least two receptions of the downlink control information occur at the same time.

In various embodiments, at least two receptions of the downlink control information occur at different times.

In one embodiment, the method further comprises receiving time-to-complete information with each transmission of the downlink control information, wherein the time-to-complete information indicates a number of orthogonal frequency domain multiplexing symbols from an end of a first downlink control information reception carrying the time-to-complete information to an end of a second downlink control information reception, the first downlink control information reception and the second first downlink control information reception carry the same downlink control information, and the second downlink control information reception is the last reception of the same downlink control information.

In certain embodiments, the user equipment acts on only one reception of the downlink control information.

In some embodiments, the transmission control indicator comprises a quasi-co-location Type A for a first non-zero power channel state information reference signal resource and for frequency range 2 a quasi-co-location Type D for a second non-zero power channel state information reference signal resource.

In various embodiments, the method further comprises reporting a user equipment capability report that indicates whether the user equipment is capable of receiving multiple transmissions having the same downlink control information.

In one embodiment, an apparatus comprises a user equipment, the apparatus comprising: a receiver that receives downlink control information a plurality of times, wherein: each reception of the downlink control information comprises the same downlink control information; and each reception of the downlink control information is in a physical downlink control channel candidate in a configured control resources set.

In certain embodiments, each transmission of the downlink control information is transmitted with a transmission control indicator state.

In some embodiments, each reception of the downlink control information is independently decodable.

In various embodiments, the receiver receives a downlink control information sequence number with each reception of the downlink control information.

In one embodiment, the downlink control information sequence number is the same for each reception of the same downlink control information.

In certain embodiments, the apparatus acts on only one reception of the same downlink control information.

In some embodiments, at least two receptions of the downlink control information occur at the same time.

In various embodiments, at least two receptions of the downlink control information occur at different times.

In one embodiment, the receiver receives time-to-complete information with each transmission of the downlink control information, the time-to-complete information indicates a number of orthogonal frequency domain multiplexing symbols from an end of a first downlink control information reception carrying the time-to-complete information to an end of a second downlink control information reception, the first downlink control information reception and the second first downlink control information reception carry the same downlink control information, and the second downlink control information reception is the last reception of the same downlink control information.

In certain embodiments, the apparatus acts on only one reception of the downlink control information.

In some embodiments, the transmission control indicator comprises a quasi-co-location Type A for a first non-zero power channel state information reference signal resource and for frequency range 2 a quasi-co-location Type D for a second non-zero power channel state information reference signal resource.

In various embodiments, the method further comprises a transmitter that transmits a user equipment capability report that indicates whether the apparatus is capable of receiving multiple transmissions having the same downlink control information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
   transmitting, to a user equipment (UE), downlink control information (DCI) a plurality of times, wherein:
      each transmission of the DCI comprises the same DCI; and
      each transmission of the DCI is in a physical downlink control channel (PDCCH) candidate in a configured control resources set (CORESET); and
   transmitting time-to-complete (TTC) information with each transmission of the DCI, wherein the TTC information indicates a number of orthogonal frequency domain multiplexing (OFDM) symbols from an end of a first DCI reception carrying the TTC information to an end of a second DCI reception, the first DCI reception and the second DCI reception carry the same DCI, and the second DCI reception is the last reception of the same DCI.

2. The method of claim 1, wherein each transmission of the DCI is transmitted with a transmission control indicator (TCI) state.

3. The method of claim 1, wherein each transmission of the DCI is independently decodable.

4. A method performed by a user equipment (UE), the method comprising:
   receiving downlink control information (DCI) a plurality of times, wherein:
      each reception of the DCI comprises the same DCI; and
      each reception of the DCI is in a physical downlink control channel (PDCCH) candidate in a configured control resources set (CORESET); and
   receiving time-to-complete (TTC) information with each transmission of the DCI, wherein the TTC information indicates a number of orthogonal frequency domain multiplexing (OFDM) symbols from an end of a first DCI reception carrying the TTC information to an end of a second DCI reception, the first DCI reception and the second DCI reception carry the same DCI, and the second DCI reception is the last reception of the same DCI.

5. The method of claim 4, wherein each transmission of the DCI is transmitted with a transmission control indicator (TCI) state.

6. The method of claim 4, wherein each reception of the DCI is independently decodable.

7. The method of claim 4, further comprising receiving a DCI sequence number with each reception of the DCI.

8. The method of claim 7, wherein the DCI sequence number is the same for each reception of the same DCI.

9. The method of claim 8, wherein the UE acts on only one reception of the same DCI.

10. The method of claim 4, wherein at least two receptions of the DCI occur at the same time.

11. The method of claim 4, wherein at least two receptions of the DCI occur at different times.

12. The method of claim 4, wherein the UE acts on only one reception of the DCI.

13. The method of claim 4, wherein a transmission control indicator (TCI) comprises a quasi-co-location (QCL) Type A for a first non-zero power (NZP) channel state information reference signal (CSI-RS) resource and for frequency range 2 a QCL Type D for a second NZP CSI-RS resource.

14. The method of claim 4, further comprising reporting a UE capability report that indicates whether the UE is capable of receiving multiple transmissions having the same DCI.

15. A base station, comprising:
at least one memory; and
at least one processor coupled with the at least one memory and configured to cause the base station to:
transmit, to a user equipment (UE), downlink control information (DCI) a plurality of times, wherein:
each transmission of the DCI comprises the same DCI; and
each transmission of the DCI is in a physical downlink control channel (PDCCH) candidate in a configured control resources set (CORESET); and
transmit time-to-complete (TTC) information with each transmission of the DCI, wherein the TTC information indicates a number of orthogonal frequency domain multiplexing (OFDM) symbols from an end of a first DCI reception carrying the TTC information to an end of a second DCI reception, the first DCI reception and the second DCI reception carry the same DCI, and the second DCI reception is the last reception of the same DCI.

16. The base station of claim 15, wherein each transmission of the DCI is transmitted with a transmission control indicator (TCI) state.

17. The base station of claim 15, wherein each transmission of the DCI is independently decodable.

18. The base station of claim 15, wherein the at least one processor is configured to cause the base station to transmit a DCI sequence number with each transmission of the DCI.

19. The base station of claim 18, wherein the DCI sequence number is the same for each transmission of the same DCI.

20. A user equipment (UE), comprising:
at least one memory; and
at least one processor coupled with the at least one memory and configured to cause the UE to:
receive downlink control information (DCI) a plurality of times, wherein:
each reception of the DCI comprises the same DCI; and
each reception of the DCI is in a physical downlink control channel (PDCCH) candidate in a configured control resources set (CORESET); and
receive time-to-complete (TTC) information with each transmission of the DCI, wherein the TTC information indicates a number of orthogonal frequency domain multiplexing (OFDM) symbols from an end of a first DCI reception carrying the TTC information to an end of a second DCI reception, the first DCI reception and the second DCI reception carry the same DCI, and the second DCI reception is the last reception of the same DCI.

* * * * *